US008547449B2

(12) United States Patent
Imamura

(10) Patent No.: US 8,547,449 B2
(45) Date of Patent: Oct. 1, 2013

(54) IMAGE PROCESSING APPARATUS WITH FUNCTION FOR SPECIFYING IMAGE QUALITY, AND METHOD AND STORAGE MEDIUM

(75) Inventor: Keiichi Imamura, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 7 days.

(21) Appl. No.: 13/422,292

(22) Filed: Mar. 16, 2012

(65) Prior Publication Data

US 2012/0236162 A1 Sep. 20, 2012

(30) Foreign Application Priority Data

Mar. 18, 2011 (JP) ................................. 2011-061417

(51) Int. Cl.
H04N 5/228 (2006.01)
H04N 9/73 (2006.01)
H04N 5/217 (2011.01)
H04N 5/222 (2006.01)
G06K 9/00 (2006.01)
G06K 9/40 (2006.01)

(52) U.S. Cl.
USPC ..................... 348/222.1; 348/223.1; 348/241; 348/333.02; 348/333.12; 382/162; 382/167; 382/274

(58) Field of Classification Search
USPC .................. 348/207.99–207.2, 222.1–225.1, 348/229.1–261, 333.01–333.13; 382/162–173, 382/181, 254–275
See application file for complete search history.

(56) References Cited

U.S. PATENT DOCUMENTS

| 6,919,927 | B1 * | 7/2005 | Hyodo .................... 348/333.02 |
|---|---|---|---|
| 7,830,420 | B2 * | 11/2010 | Hyoudou ................... 348/229.1 |
| 2002/0154829 | A1 * | 10/2002 | Tsukioka ..................... 382/254 |
| 2004/0125220 | A1 * | 7/2004 | Fukuda et al. ................ 348/234 |
| 2005/0041103 | A1 * | 2/2005 | Kinjo ......................... 348/207.1 |
| 2006/0192879 | A1 * | 8/2006 | Hisamatsu ............... 348/333.01 |
| 2006/0250515 | A1 * | 11/2006 | Koseki et al. ................ 348/362 |
| 2007/0065137 | A1 * | 3/2007 | Hara et al. ................... 396/291 |

(Continued)

FOREIGN PATENT DOCUMENTS

| JP | 2003-234916 A | 8/2003 |
|---|---|---|
| JP | 2008-011289 A | 1/2008 |
| JP | 2010-273167 A | 12/2010 |
| JP | 2011-107899 A | 6/2011 |

OTHER PUBLICATIONS

Japanese Office Action dated Aug. 21, 2012 (and English translation thereof) in counterpart Japanese Application No. 2011-061417.

(Continued)

Primary Examiner — Michael Osinski
(74) Attorney, Agent, or Firm — Holtz, Holtz, Goodman & Chick, PC

(57) ABSTRACT

An image processing apparatus to be employed at an imaging device. An image acquisition section acquires data of an image. An input operation receiving section receives an operation for selection of an image region of the image data acquired by the image acquisition section. An image quality processing choosing section chooses image quality processing to be applied to the image data acquired by the image acquisition section in accordance with the image region received by the input operation receiving section. An image quality processing information presentation section presents information relating to the image quality processing chosen by the image quality processing decision section.

7 Claims, 10 Drawing Sheets

(56) References Cited

U.S. PATENT DOCUMENTS

| | | | |
|---|---|---|---|
| 2009/0073285 A1* | 3/2009 | Terashima | 348/231.99 |
| 2009/0135269 A1* | 5/2009 | Nozaki et al. | 348/222.1 |
| 2009/0256947 A1* | 10/2009 | Ciurea et al. | 348/333.12 |
| 2010/0157084 A1* | 6/2010 | Shimamura et al. | 348/222.1 |
| 2011/0058087 A1* | 3/2011 | Ito et al. | 348/333.12 |
| 2011/0090368 A1* | 4/2011 | Iwamoto et al. | 348/231.99 |
| 2011/0096195 A1* | 4/2011 | Nagoya | 348/231.3 |
| 2011/0116685 A1 | 5/2011 | Sugita | |
| 2011/0242395 A1* | 10/2011 | Yamada et al. | 348/333.02 |
| 2012/0002067 A1* | 1/2012 | Fukata | 348/222.1 |
| 2013/0010170 A1* | 1/2013 | Matsuzawa et al. | 348/333.01 |

OTHER PUBLICATIONS

Japanese Office Action dated Jun. 25, 2013 (and English translation thereof) in counterpart Japanese Application No. 2012-197598.

* cited by examiner

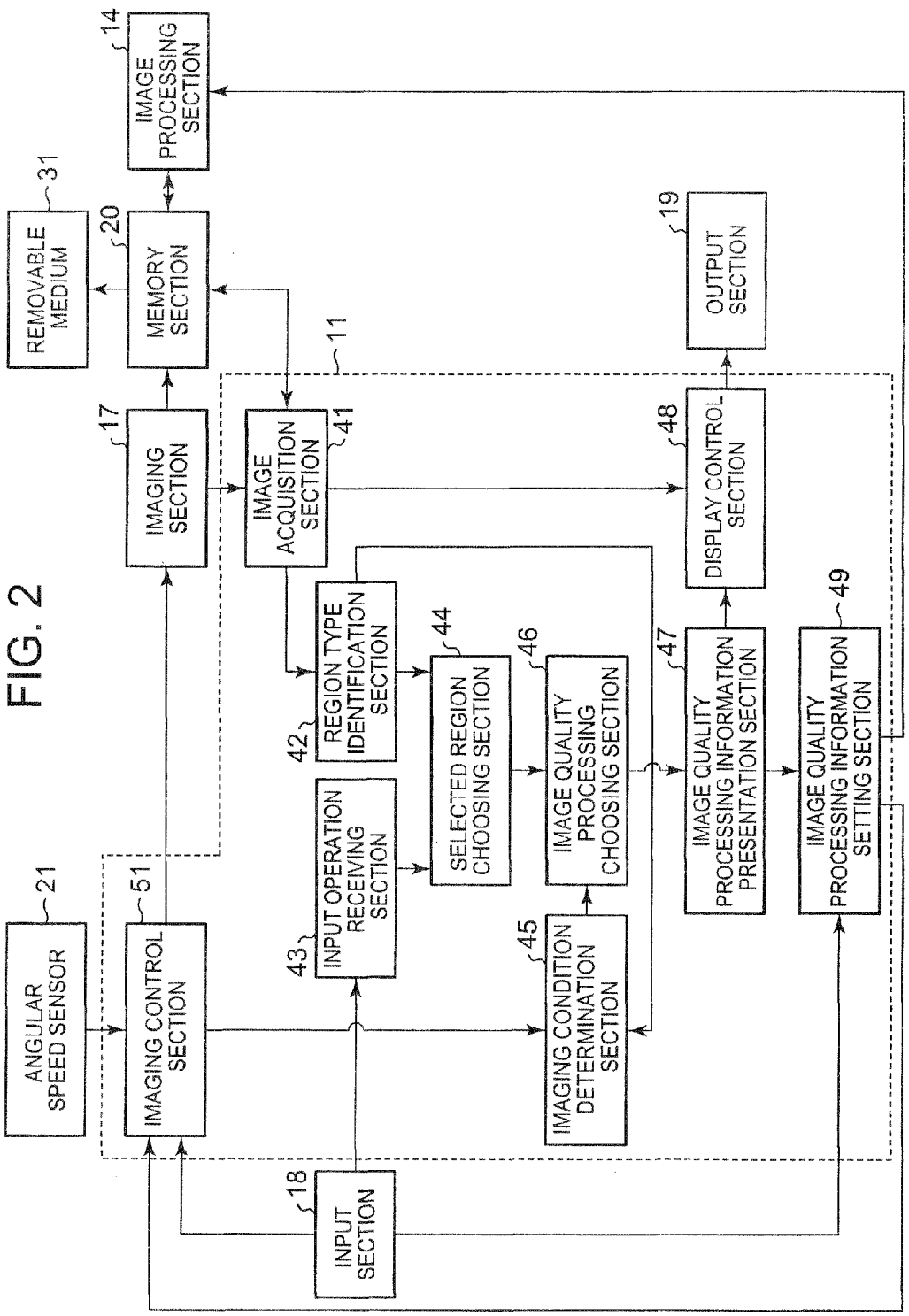

FIG. 3

| IMAGING ENVIRONMENT | TOUCHED PORTION (SELECTED REGION) | SUPPLEMENTARY CONDITION | MENU ITEMS (IMAGE QUALITY PROCESSING INFORMATION) | ACTUAL PROCESSING | DEFAULT |
|---|---|---|---|---|---|
| PERSON | FACE | — | TAKE A CLEAR PICTURE OF A PERSON'S FACE | PERSON MAKEUP | ON |
| | FACE | — | SELECT A MOMENT WITH OPEN EYES AND A SMILE | BEST SHOT | OFF |
| | FACE | HIGH ZOOM | RAISE ISO SENSITIVITY TO PREVENT BLUR | AUTOMATIC ISO SENSITIVITY CONTROL | ON |
| | OUTSIDE FACE | — | <NONE> | — | — |
| | OUTSIDE FACE | HIGH ZOOM | RAISE ISO SENSITIVITY TO PREVENT BLUR | AUTOMATIC ISO SENSITIVITY CONTROL | ON |
| | FACE | — | USE FLASH AND CORRECT BACKLIGHTING | FLASH + i-COLOR | ON |
| | FACE | — | DO NOT USE FLASH AND CORRECT BACKLIGHTING | EXTRA LIGHTING | OFF |
| | FACE | — | TAKE A CLEAR PICTURE OF A PERSON'S FACE | PERSON MAKEUP | ON |
| | FACE | — | SELECT A MOMENT WITH OPEN EYES AND A SMILE | BEST SHOT | OFF |
| PERSON + BACKLIGHTING + SKY + VEGETATION + SUNLIGHT | FACE | HIGH ZOOM | RAISE ISO SENSITIVITY TO PREVENT BLUR | ALTER PROGRAM CHART | ON |
| | SKY | — | EMPHASIZE SKY | ADJUST SKY | ON |
| | SKY | — | CHANGE SKY TO STRONG BLUES | ALTER CONTRAST | OFF |
| | | — | WHITE BALANCE WITH TREE SHADE | WHITE BALANCE/LIGHT AND SHADE | OFF |
| | | — | SET VEGETATION TO LIVELY COLORS | LANDSCAPE MAKEUP | ON |
| | | — | CHANGE VEGETATION TO STRONG GREENS | ALTER CONTRAST | OFF |
| | FACE | — | WHITE BALANCE WITH TREE SHADE | WHITE BALANCE/LIGHT AND SHADE | OFF |
| | OTHER | — | WHITE BALANCE WITH TREE SHADE | WHITE BALANCE/LIGHT AND SHADE | OFF |
| PERSON + NIGHT SCENE | FACE | NO TRIPOD | USE FLASH FOR A BRIGHT PICTURE | FLASH + i-COLOR | ON |
| | FACE | NO TRIPOD | TAKE A CLEAR PICTURE OF A PERSON'S FACE | PERSON MAKEUP | ON |
| | FACE | NO TRIPOD | SUPPRESS SHINE FROM A PERSON'S FACE | DIGITAL FOUNDATION | ON |
| | FACE | NO TRIPOD | RAISE ISO SENSITIVITY TO PREVENT BLUR | AUTOMATIC ISO SENSITIVITY CONTROL | ON |
| | BACKGROUND OUTSIDE FACE | NO TRIPOD | SLOW SHUTTER SPEED FOR BRIGHT BACKGROUND | ALTER PROGRAM CHART | OFF |
| | | NO TRIPOD | APPLY WEAK NOISE REDUCTION | ADAPTIVE NOISE REDUCTION | ON |
| | | NO TRIPOD | APPLY STRONG NOISE REDUCTION | ADAPTIVE NOISE REDUCTION | OFF |
| ... | ... | ... | ... | ... | ... |

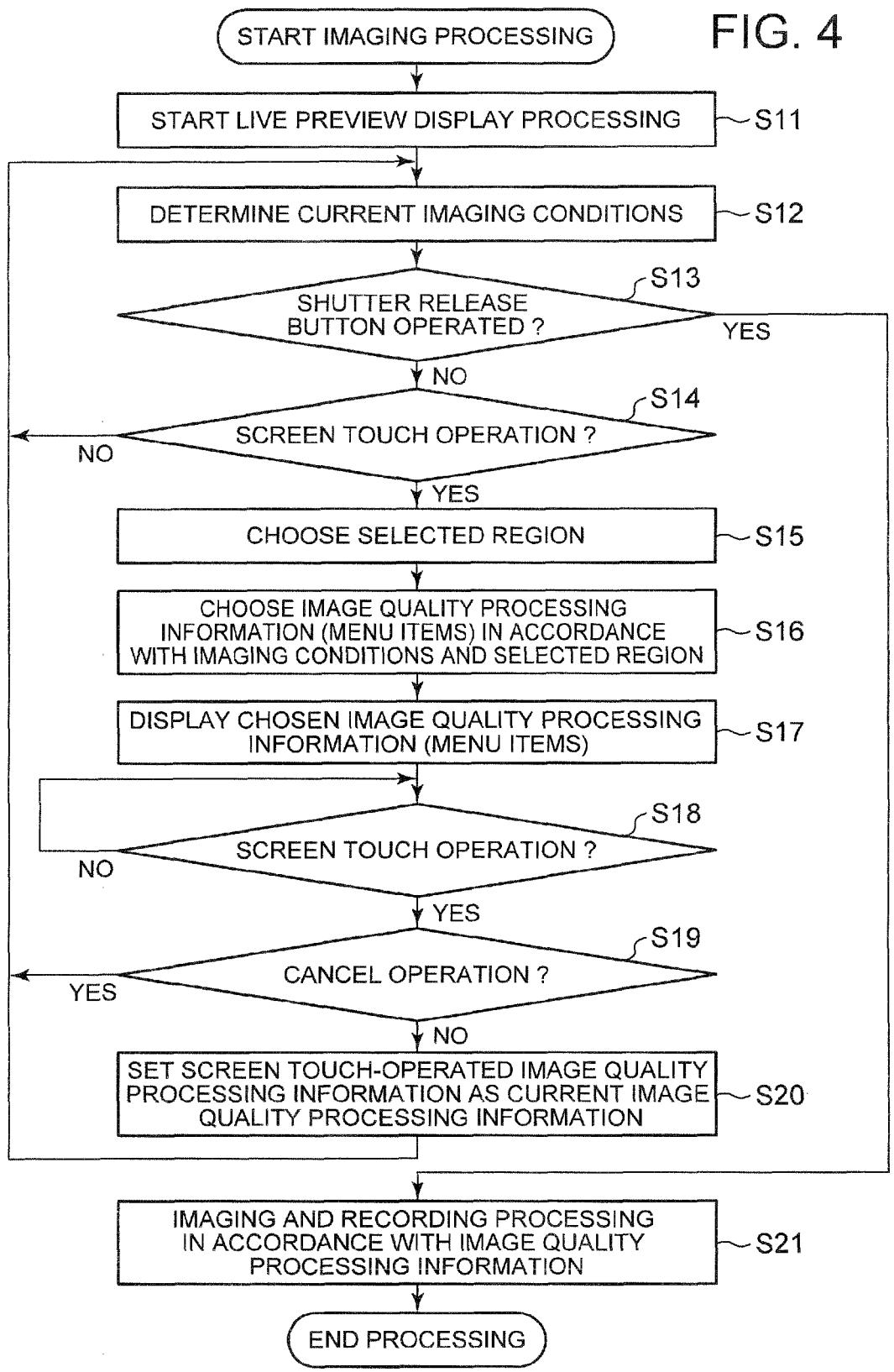

ized in a ROM of the imaging device 1;

IMAGE PROCESSING APPARATUS WITH FUNCTION FOR SPECIFYING IMAGE QUALITY, AND METHOD AND STORAGE MEDIUM

This application is based upon and claims the benefit of priority from the prior Japanese Patent Application No. 2011-061417, filed Mar. 18, 2011, and the entire contents of which are incorporated herein by reference.

BACKGROUND OF THE INVENTION

1. Field of the Invention

The present invention relates to a technology for specifying image quality.

2. Related Art

In recent years, consequent to imaging conditions and/or image processing conditions being specified, digital cameras may capture images with the specified imaging conditions and may process images with the specified image processing conditions. In light of the difficulties of specifying imaging conditions and image processing conditions, digital cameras are known that automatically specify imaging conditions and/or image processing conditions in accordance with the surrounding environment during imaging and suchlike.

SUMMARY OF THE INVENTION

An image processing apparatus relating to a first aspect of the present invention includes:
  an acquiring unit that acquires data of an image;
  a receiving unit that receives an operation of selection of a region of the image acquired by the acquiring unit;
  an image quality processing choosing unit that, in accordance with the image at the region selected by the selection operation, chooses image quality processing to be applied to the image data acquired by the acquiring unit; and
  a presenting unit that presents information relating to the image quality processing chosen by the image quality processing choosing unit.

An image processing method relating to a second aspect of the present invention is
  an image processing method to be executed by an image processing apparatus that acquires an image, the method including:
  acquiring data of the image;
  receiving an operation of selection of a region of the acquired image data;
  choosing, in accordance with the image at the region selected by the selection operation, image quality processing to be applied to the acquired image data; and
  presenting information relating to the image quality processing.

A computer readable storage medium relating to a third aspect of the present invention has stored therein a program executable by a computer that controls an image processing apparatus that acquires an image, causing the computer to realize functions of:
  acquiring data of the image;
  receiving an operation of selection of a region of the acquired image data;
  choosing, in accordance with the image at the region selected by the selection operation, image quality processing to be applied to the acquired image data; and
  presenting information relating to the image quality processing.

BRIEF DESCRIPTION OF THE DRAWINGS

A deeper understanding of the present application will be attained when the detailed descriptions hereinafter are viewed together with the following drawings.

FIG. 2 is a block diagram illustrating, of functional structures of the imaging device 1, a functional structure for implementing imaging processing;

FIG. 3 is a diagram illustrating a reference table memorized in a ROM of the imaging device 1;

FIG. 4 is a flowchart describing a flow of imaging processing;

DETAILED DESCRIPTION OF THE INVENTION

Herebelow, an exemplary embodiment of the present invention is described in detail with reference to the attached drawings.

Figure 1:
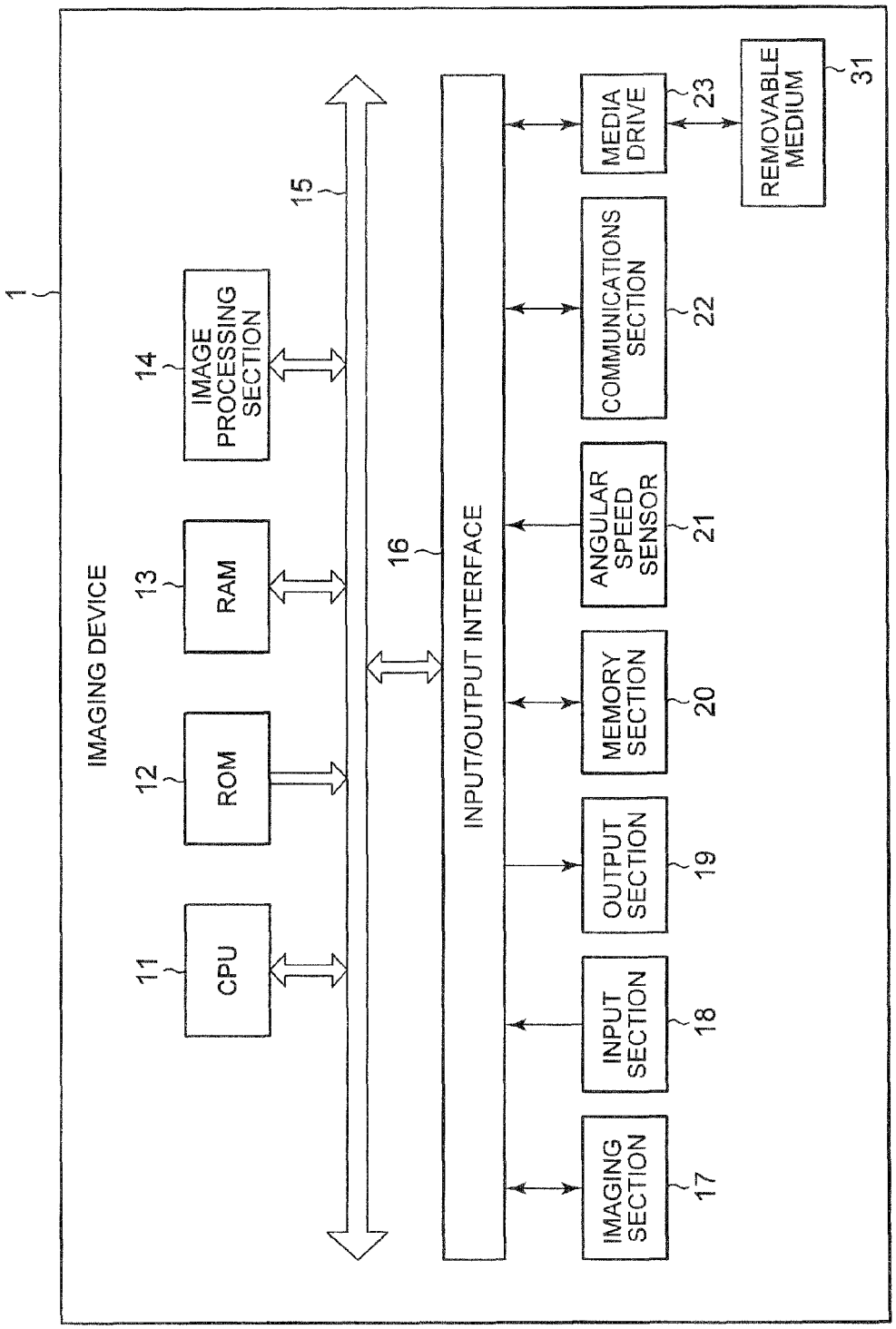
FIG. 1 is a block diagram illustrating hardware structure of an imaging device 1.

An image processing apparatus relating to the exemplary embodiment of the invention is described. FIG. 1 is a block diagram illustrating hardware structure of the imaging device 1. The imaging device 1 is configured as, as an example, a digital camera.

The imaging device 1 is provided with a central processing unit (CPU) 11, a read-only memory (ROM) 12, a random access memory (RAM) 13, an image processing section 14, a bus 15, an input/output interface 16, an imaging section 17, an input section 18, an output section 19, a memory section 20, an angular speed sensor 21, a communications section 22 and a media drive 23.

The CPU 11 executes various kinds of processing in accordance with programs stored in the ROM 12 and/or programs loaded into the RAM 13 from the memory section 20.

The RAM 13 memorizes data required for the execution of the various kinds of processing by the CPU 11 and suchlike as appropriate.

The image processing section 14 is constituted by a digital signal processor (DSP) and a video random access memory (VRAM) or the like, and works together with the CPU 11 to apply various kinds of image processing to data of images. For example, the image processing section 14 applies, to image data outputted from the imaging section 17, various kinds of image processing, such as noise reduction, white balance adjustment, blur correction and the like, on the basis of image processing information specified by an image quality processing information setting section 49 of FIG. 2, which is described below.

The bus 15 connects the CPU 11, the ROM 12, the RAM 13, the image processing section 14 and the input/output interface 16 to one another. The imaging section 17, the input section 18, the output section 19, the memory section 20, the angular speed sensor 21, the communications section 22 and the media drive 23 are connected to the input/output interface 16.

The imaging section 17 is equipped with an unillustrated optical lens unit, which includes a focusing lens, a zoom lens and the like, and an image sensor.

The optical lens unit is formed with different kinds of lenses, such as the focusing lens and the zoom lens or the like. The focusing lens is a lens that focuses a subject image on a light detection face of an image sensor. The zoom lens is a lens that arbitrarily alters the focusing distance through a certain range. As required, the optical lens unit is also provided with peripheral circuits for adjusting specified parameters such as focusing point, exposure, white balance and so forth.

The image sensor is structured with an optoelectronic conversion device, an analog front end (AFE) and the like. The optoelectronic conversion device is constituted of, for example, a CMOS (complementary metal oxide semiconductor) device and the like, and optoelectronically converts incident light that enters through the optical lens unit. That is, the optoelectronic conversion device optoelectronically converts (captures) a subject image and accumulates image signals for a predetermined duration, and sequentially provides the accumulated image signals to the AFE as analog signals. The AFE applies various kind of signal processing to the analog image signals, such as analog-to-digital (A/D) conversion processing and the like. The digital signals generated by the signal processing are outputted as output signals from the imaging section 17. The output signals from the imaging section 17 are referred to hereinafter as "image data". Data of the captured images is provided to the CPU 11 as appropriate.

This imaging section 17 is controlled by an imaging control section 51, which is described herebelow with reference to FIG. 2. The imaging control section 51 specifies, for example, various imaging conditions of the imaging section 17. For example, as one of the imaging conditions, the imaging control section 51 specifies a zoom ratio and controls an unillustrated lens driving unit to drive the zoom lens to the specified zoom ratio.

The input section 18 is structured with various buttons, such as a power supply button, a shutter release button and the like, and a touch panel. The input section 18 inputs various kinds of information in accordance with instruction operations by a user.

The structure and type of the touch panel are not particularly limited; a resistive film-type or static capacitance-type touch panel or the like can be employed. A resistive film-type touch panel is formed by overlaying, in parallel on a display screen of a display of the output section 19, a soft surface layer such as polyethylene terephthalate (PET) and a liquid crystal glass layer therebeneath. Respective transparent conductive films are applied to inner sides of the two layers, and are electrically insulated by transparent spacers therebetween. Respective conductive bodies are arranged at the surface layer and the glass layer. When the display screen is touched with a pointing object such as a finger or a stylus pen (hereinafter, this is referred to as a screen touch operation), the surface layer inflects in accordance with stress from the pointing object, and the surface layer and the glass layer are put into a conductive state locally. At this time, electrical resistance values, potentials or the like vary in accordance with the touching position of the pointing object. The CPU 11 detects the coordinates of the touching position of the pointing object on the basis of these variations in electrical resistance values, potentials or the like.

The output section 19 is structured with the display and a speaker or the like, and outputs images and sound or the like.

The memory section 20 is structured with a hard disc, a dynamic random access memory (DRAM) or the like, and memorizes data of various images.

The angular speed sensor 21 detects movements of the imaging device 1 and outputs movement detection signals representing angular speeds (blur signals) to the CPU 11. More specifically, the angular speed sensor 21 outputs the movement detection signals to the imaging control section 51 of the below-described FIG. 2. For example, by analyzing the blur signals, the imaging control section 51 may determine whether or not a supplementary condition, in regard to the imaging device 1 imaging while mounted on a tripod (not shown), is satisfied. The meaning of the term "supplementary condition" as used herein includes conditions that are not directly categorized as imaging conditions or as image processing conditions but that have some effect on the results of imaging operations by the imaging section 17, image processing by the image processing section 14 and the like. The supplementary conditions include arbitrary numbers and arbitrary types of conditions. That is to say, the condition of whether the imaging device 1 is imaging while not mounted on a tripod (not shown) (hereinafter referred to as "no tripod" imaging) is merely an illustrative example of a supplementary condition.

Specifically, if it is determined that the detected blur signals are smaller than a threshold value, the imaging control section 51 determines that the imaging device 1 is mounted on a tripod. On the other hand, if the imaging control section 51 determines that the detected blur signals are larger than the threshold value, the imaging control section 51 determines that the imaging device 1 is not mounted on a tripod but is imaging while being held by hand.

The imaging control section 51 may calculate correction amounts and drive the image sensor with an actuator provided at the imaging section 17 in accordance with the blur signals detected by the angular speed sensor 21. In this case, the actuator drives the image sensor in directions orthogonal to the optical axis of the optical lens unit in accordance with correction amounts from the imaging control section 51.

The communications section 22 controls communications with other devices (not shown) via networks, including the Internet.

A removable medium 31, which is constituted with a magnetic disc, an optical disc, a magneto-optical disc, a semiconductor memory or the like, is loaded in the media drive 23. As required, programs read from the removable medium 31 by the media drive 23 are installed in the memory section 20. The removable medium 31 may also, similarly to the memory section 20, memorize various kinds of data such as image data that has been memorized in the memory section 20 and the like.

FIG. 2 is a block diagram illustrating, of functional structure of the imaging device 1, a functional structure for implementing imaging processing.

The term "imaging processing" as used herein, rather than referring to ordinary imaging processing, includes the following sequence of processing. In accordance with a screen touch operation by a user, the imaging device 1 chooses one or more display objects from information relating to the specification of image quality processes (hereinafter referred to as image quality processing information), and displays the one or more display objects on the display of the output section 19. The term "image quality processing" as used herein is intended to include, in processing by the imaging device 1 that is executed from capture to storage of an image, processes that affect image quality of the image. Control processing that is applied to the imaging section 17 before or during capture of an image and image processing that is applied to captured image data that is outputted from the imaging section 17 are employed herein as an example of image quality processing. The user performs a screen touch operation on, of the one or more items of image quality processing information displayed thus, an item of image quality processing information (a region within the screen at which that information is displayed) that the user wishes to set. In response, the imaging device 1 sets the image quality processing information to which the screen touch operation has been applied as setting information. Hence, the imaging device 1 executes image quality processing in accordance with the specified setting information.

When imaging processing is being executed, the CPU 11 functions as an image acquisition section 41, a region type identification section 42, an input operation receiving section 43, a selected region choosing section 44, an imaging condition determination section 45, an image quality processing choosing section 46, an image quality processing information presentation section 47, a display control section 48 and an image quality processing information setting section 49. The CPU 11 also functions as the imaging control section 51 for controlling the imaging section 17.

The image acquisition section 41 acquires captured image data outputted from the imaging section 17 to serve as data of a live preview image. That is, the CPU 11 and the like cause live preview images to be displayed at the display of the output section 19 by executing live preview imaging processing and live preview display processing during, and before and after, the execution of imaging processing. Specifically, for example, when an operation mode of the CPU 11 and the like is switched to an imaging operation mode, an imaging operation by the imaging section 17 is made to continue. Then, while the imaging operation is being continued by the imaging section 17, the CPU 11 and the like temporarily memorize captured image data that is sequentially outputted from the imaging section 17 in a memory (in the present embodiment, the memory section 20). This sequence of control processing is referred to as "live preview imaging processing" herein. The CPU 11 and the like also sequentially read the captured image data that has been temporarily recorded in the memory (the memory section 20 in the present embodiment) during the live preview imaging processing, and cause the captured images to be sequentially displayed at the output section 19. This sequence of control processing is referred to as "live preview display processing" herein. The captured images displayed at the output section 19 by the live preview display processing are referred to herein as "live preview images". That is, in the live preview display processing, the image acquisition section 41 executes processing up to data of a live preview image that has been temporarily memorized in the memory being acquired and provided to the region type identification section 42 and the display control section 48. The display control section 48, which is described below, executes processing up to the live preview image being displayed through the output section 19.

The region type identification section 42 identifies object regions of one or more types in a live preview image provided by the image acquisition section 41. The term "object region" as used herein is intended to include a region that shows a characteristic object in a live preview image. Herein, the term "object" is intended to include, as well as features that are generally in the foreground, background objects such as sunlight, the sky and the like, and other things that may be contrasted with a subject (a feature). In the present embodiment, a variety of regions are employed as types of object region, such as "landscape", "sky", "vegetation", "sunset", "person", "night scene", "backlighting", "macro", "action" and so forth. Specifically, the region type identification section 42 calculates contrast variations using color information and the like from a live preview image and, on the basis of the calculation results, identifies regions contained in the live preview image that represent a person, vegetation and the like as being object regions. An object region identification method is not particularly limited herein. A method of detecting outlines using pixel values of the edges of background images and identifying regions within the outlines as object regions may be employed. The region type identification section 42 provides data of the live preview image and information capable of defining the identified object regions in the live preview image, for example, information including positional coordinates of the object regions, to the selected region choosing section 44.

The input operation receiving section 43 receives, by means of the input section 18, an operation of selection of an image region of the live preview image acquired by the image acquisition section 41. Specifically, when a screen touch operation is performed on a desired range (of the touch panel of the input section 18) whose image quality is to be adjusted in the live preview image displayed at the whole display screen of the output section 19, this range may be selected. The input operation receiving section 43 receives the screen touch operation, recognizes the image region selected by the screen touch operation, and provides the recognition result to the selected region choosing section 44. Although the input operation receiving section 43 recognizes the image region from a screen touch operation, this is not a limitation. As another example, an image region may be recognized on the basis of an operation of selection range specification buttons (not shown) of the input section 18.

On the basis of the image region recognized by the input operation receiving section 43, the selected region choosing section 44 chooses an object region selected by the user from the one or more object regions identified by the region type identification section 42 to be a processing object for image quality processing (hereinafter referred to as the selected region). Specifically, from the one or more object regions identified by the region type identification section 42, the selected region choosing section 44 chooses an object region that contains the image region recognized by the input operation receiving section 43 to be the selected region. The selected region choosing section 44 provides information with which the chosen selected region can be defined to the image quality processing choosing section 46.

The imaging condition determination section 45 determines conditions relating to supplementary conditions and the imaging environment (hereinafter referred to as imaging conditions). Beside the aforementioned "no tripod" condition determined on the basis of blur signals detected by the angular speed sensor 21, a condition of the zoom ratio of the imaging section 17 specified by the imaging control section 51 being more than a certain value (referred to hereinafter as "high zoom") may be employed as a supplementary condition. The meaning of the term "imaging environment" as used herein is intended to include an environment as defined from details contained within the imaging angle of the imaging device 1 at a current time. More specifically, the environment is defined on the basis of the one or more object regions contained in the live preview image that are identified by the region type identification section 42. In the present embodiment, "landscape", "landscape+sky", "landscape+vegetation", "landscape+sunset", "person", "landscape+person", "night scene", "night scene+person", "person+backlighting", "macro", "action" and "landscape+sky+vegetation+person+action+backlighting" are employed as imaging environments. The imaging condition determination section 45 provides information representing the determined imaging environment to the image quality processing choosing section 46.

On the basis of the imaging conditions determined by the imaging condition determination section 45 and the selected region chosen by the selected region choosing section 44, the image quality processing choosing section 46 chooses one or more candidates for image quality processes to be applied to the live preview image data acquired by the image acquisition section 41. Specifically, the meaning of the term "selected region" as used herein includes, of the touch panel (the input section 18) superimposed on the whole screen of the display (the output section 19) at which the live preview image is displayed as described above, a screen touch-operated portion of the live preview image that serves as a desired range to which image quality processing should be applied. Accordingly, if the selected region is also referred to as the "touched portion" hereinafter, the image quality processing choosing section 46 chooses image quality processes in accordance with the touched portion determined by the screen touch operation by the user and the imaging environment and supplementary conditions determined by the imaging condition determination section 45. The image quality processing choosing section 46 provides information relating to the chosen image quality processes (hereinafter referred to as image quality processing information) to the image quality processing information presentation section 47.

More specifically, the image quality processing choosing section 46 chooses the image quality processing information in accordance with a reference table recorded in the ROM 12, and provides the image quality processing information to the image quality processing information presentation section 47. The reference table is described below.

FIG. 3 illustrates a structural example of the reference table memorized in the ROM 12 of the imaging device of FIG. 1. The reference table is a table representing relationships between combinations of imaging environment, touched portion and a supplementary condition (hereinafter referred to as condition combinations) and combinations of menu items, actual processes and default settings. The structure of the reference table is not particularly limited provided it represents these relationships. In the present embodiment, the structure of the reference table is the array structure illustrated in FIG. 3. A row of the reference table in FIG. 3 stores and relates a single condition combination, defined by an imaging environment, a touched portion and a supplementary condition, with a menu item, an actual process and a default setting that are to be applied with this condition combination.

Specifically, the "menu item" stored in this row is information representing details of the image quality processing information to be applied with the condition combination related in this row. This menu item is content of the image quality processing information that is to be presented by the image quality processing information presentation section 47, which is described below.

The "actual processing" stored in this row is information representing details of an image quality process to be applied to the condition combination related in this row. That is, the actual processing represents respective content of image processing that is actually executed by the image processing section 14, which is described below, and imaging processing that is actually executed by the imaging control section 51.

The "default" stored in this row represents a default (initial setting) of whether execution of each image quality process stored in the "actual processing" of this row to be applied with the condition combination related in this row is allowed or prohibited. In this case, allowance of execution of the image processing is represented by "ON", and prohibition of execution of the image processing is represented by "OFF". That is, image processing for which "ON" is set as the default is executed unless a user changes the setting to "OFF". In contrast, image processing for which "OFF" is set as the default is not executed (the execution is prohibited) unless a user changes the setting to "ON".

A point to note here is that, as illustrated in FIG. 3, even if the same touched portion is selected, the menu item(s) (image quality processing information) differ(s) depending on the imaging environment and the supplementary condition. For example, if a "face" is selected as the touched portion, the menu items (image quality processing information) differ between a case when the imaging environment is "person" and a case when the imaging environment is "person+night scene". Specifically, if the imaging environment is "person" and the touched portion is "face", the chosen menu items (image quality processing information) are "Take a clear picture of a person's face", "Select a moment with open eyes and a smile", and "Raise ISO sensitivity to prevent blur". In contrast, if the imaging environment is "person+night scene" and the touched portion is "face", the chosen menu items (image quality processing information) are "Use flash for a bright picture", "Take a clear picture of a person's face", and "Suppress shine from a person's face".

Types of image quality processing that the actual processing can be are not particularly limited by the examples disclosed in FIG. 3. In the present embodiment, the following types (1) to (10) are employed as image quality processes that the actual processing may be. Note that the numbers and types of image quality process that are related with a single condition combination as the actual processing are not particularly limited; of the following types (1) to (10), arbitrary numbers of arbitrary combinations thereof may be related with condition combinations.

(1) Intelligent autofocus (variable control of the focusing point)
(2) Person makeup
(3) Landscape makeup (local chroma adjustment)
(4) Overall chroma adjustment
(5) White balance
(6) Intelligent color (local hue adjustment)
(7) Adaptive noise reduction
(8) Adaptive ISO sensitivity control/shutter speed control
(9) Adaptive sharpness
(10) Lighting (adaptive gamma curve adjustment)

The image quality processing information presentation section 47 presents the image quality processing information chosen by the image quality processing choosing section 46 to the user. A mode of presentation is not particularly limited herein. For example, a mode in which the information is presented by sounds may be employed. In the present embodiment, however, a mode is employed in which an image containing menu items representing the image quality processing information is displayed on the display of the output section 19. Specifically, the image quality processing information presentation section 47 refers to the reference table in FIG. 3, reads the menu items (image quality processing information) corresponding with the combination of imaging environment, touched portion and supplementary condition, and provides the image quality processing information to the image quality processing information setting section 49 and the display control section 48.

The display control section 48 displays the image containing the menu items (image quality processing information) presented by the image quality processing information presentation section 47 superimposed on the live preview image provided from the imaging section 17. That is, the display control section 48 causes a superimposed image (hereinafter referred to as an image quality processing information-superimposed image) to be displayed at the display of the output section 19. Data of this image quality processing information-superimposed image may also be outputted to unillustrated external equipment by the communications section 22. Thus, the image quality processing information-superimposed image may be displayed at the external equipment, for example, at a television set, a personal computer, a projector or the like.

From plural items of image quality processing information (menu items) presented by the image quality processing information presentation section 47, the image quality processing information setting section 49 sets a selected item of image quality processing information as current setting information. The image quality processing information setting section 49 provides the specified image quality processing information to the imaging control section 51 and the image processing section 14. Details of this setting of the image quality processing information are described below with reference to FIG. 5 and FIG. 6A to FIG. 10C.

The imaging control section 51 executes control of an imaging operation of the imaging section 17 in accordance with the image quality processing information specified by the image quality processing information setting section 49.

The image processing section 14 performs image processing in accordance with the image quality processing information specified by the image quality processing information setting section 49. Specifically, when the image quality processing information is specified by the image quality processing information setting section 49, the image processing section 14 acquires data of a captured image that is being displayed as the live preview image at the moment of this instruction from the memory section 20. From the data of the captured image (the live preview image), the image processing section 14 generates data of an image quality-processed image in accordance with the specified image quality processing information, and memorizes this data to the removable medium 31.

Next, the imaging processing that is executed by the imaging device 1 is described with reference to FIG. 4. FIG. 4 is a flowchart describing a flow of the imaging processing executed by the imaging device 1.

The start of the imaging processing is triggered by the operation mode of the imaging device 1 being switched into the imaging mode by an operation of the input section 18 by a user. Thereafter, the imaging processing is repeatedly executed at intervals of a unit of time. That is, the following processing is repeatedly executed, each time the unit of time passes.

In step S11, the display control section 48 starts live preview display processing. Hence, the live preview image is displayed at the display of the output section 19. In the present embodiment, when the live preview display processing is begun by the processing of step S11, the live preview image continues to be displayed at the display of the output section 19 thereafter until the imaging processing is ended. When the live preview image display processing is begun, the region type identification section 42 continues to repeatedly, at frame intervals, execute the identification of types of object regions in the data of the live preview images acquired by the image acquisition section 41.

In step S12, the imaging condition determination section 45 determines the current imaging conditions. That is, of the imaging conditions, the imaging condition determination section 45 determines the imaging environment on the basis of the object regions of one or more types identified by the region type identification section 42. The imaging condition determination section 45 also determines the supplementary conditions on the basis of the blur signals from the angular speed sensor 21 and the zoom ratio of the imaging section 17.

In step S13, the imaging control section 51 determines whether or not the shutter release button of the input section 18 has been pressed. If the shutter release button has not been pressed, the determination in step S13 is "NO", and the processing proceeds to step S14.

In step S14, the input operation receiving section 43 determines whether or not a screen touch operation has been performed. If a screen touch operation has not been performed, the determination in step S14 is "NO", the processing proceeds to step S12, and the processing thereafter is repeated. That is, the loop from step S12 to step S14 is repeatedly executed as long as the shutter release button is not operated and there is no screen touch operation, and the imaging processing is in a standby state.

Then, when a screen touch operation is performed, the determination in step S14 is "YES", a range in which the screen touch operation has been performed is recognized by the input operation receiving section 43, and the processing proceeds to step S15. In step S15, of the object regions of one or more types identified from the live preview image by the region type identification section 42, the selected region choosing section 44 chooses, from the processing of step S14, an object region that contains the range at which the screen touch operation has been performed to be the selected region.

In step S16, on the basis of the imaging conditions determined by the processing of step S12 and the selected region identified by the processing of step S15, the image quality processing choosing section 46 refers to the reference table of FIG. 3 and chooses image quality processing information (menu items).

In step S17, under the control of the image quality processing information presentation section 47, the display control section 48 displays the image quality processing information (menu items) chosen in the processing of step S16 at the display of the output section 19. Specifically, the display control section 48 superimposes the image quality processing information (menu items) on the live preview image and displays the result as the image quality processing information-superimposed image on the display of the output section 19.

In step S18, the input operation receiving section 43 determines whether or not a screen touch operation has been performed. The screen touch operation determined in the processing of step S18 differs in meaning from the screen touch operation determined in the processing of step S14. That is, as is described in more detail below with reference to the drawings from FIG. 6A onward, the meaning of the image quality processing information (menu items) being displayed by the processing of step S17 is that one or more types of image quality processing information are displayed separated into fields, and whether the image quality process represented by the image quality processing information corresponding to each field will be executed is displayed in the form "ON" or "OFF". Note that the setting of whether the image quality processing for each field will be executed need not be established at the point at which the image quality processing information (menu items) is displayed by the processing of step S17.

Hence, by a screen touch operation being performed on, of the displayed image quality processing information (menu items), a field of the image quality processing information for which a change of setting is desired, the setting of whether or not the image quality process represented by that image quality processing information will be executed may be changed.

Alternatively, if the user judges that there is no problem with the settings of whether or not the image quality processes corresponding to the respective fields will be executed in the image quality processing information (menu items) as displayed, the user may keep the current settings by performing a screen touch operation on a region outside the image quality processing information (menu items). At this time, the display of the image quality processing information (menu items) is removed. This screen touch operation that is performed on a region outside the image quality processing information (menu items) is hereinafter referred to as a "cancel operation".

Therefore, in step S18, it is determined whether no screen touch operation has been performed on any region in the whole screen of the display of the output section 19.

If the input operation receiving section 43 determines that no screen touch operation has been performed thus ("NO" in step S18), the processing returns to step S18 again. That is, the determination processing of step S18 is repeatedly executed until a screen touch operation is performed, and the imaging processing is in the standby state.

Thereafter, when a screen touch operation is performed by the user in a region of the image quality processing information-superimposed screen, the determination of step S18 is "YES", and the processing proceeds to step S19.

In step S19, the input operation receiving section 43 determines whether or not the cancel operation has been performed.

Specifically, if a screen touch operation has been performed at a region other than the image quality processing information (menu items) of the image quality processing information-superimposed image, a cancel operation has been performed, the determination of step S19 is "YES", and the display of the image quality processing information (menu items) is removed. Then the processing returns to step S12 and the subsequent processing is repeated.

On the other hand, if a screen touch operation has been performed at a region of the image quality processing information-superimposed image within the image quality processing information (menu items), the determination of step S18 is "YES" and the determination of step S19 is "NO", and the processing proceeds to step S20.

In step S20, of the image quality processing information at which the screen touch operation has been performed in the processing of step S18, the image processing section 14 toggles the field (setting) between ON and OFF, and sets this as the current image quality processing information.

When this processing ends, the display of the image quality processing information (menu items) is removed, after which the processing returns to step S12 and the subsequent processing is repeated.

Thereafter, when the shutter release button is operated, the determination in step S13 is "YES" and, in step S21, the imaging control section 51 and the image processing section 14 carry out imaging and recording processing.

The meaning of the term "imaging and recording processing" as used herein includes a sequence of processing of, in accordance with the specified image quality processing information, carrying out an imaging operation with imaging conditions represented by the image quality processing information, applying imaging processing to the resulting captured image data with conditions represented by the image quality processing information, up to recording the image-processed captured image data in the memory (the removable medium 31 of FIG. 1 or the like).

When this processing is completed, the imaging processing ends.

If the user operates the shutter release button ("YES" in step S13 of FIG. 4) without performing any screen touch operations ("NO" in step S14 of FIG. 4), the imaging control section 51 and the image processing section 14 refer to the reference table of FIG. 3, and execute the imaging and recording processing with the default conditions.

Herebelow, the imaging processing is specifically described further with reference to FIG. 5 and FIG. 6A to FIG. 10C.

Figure 5:
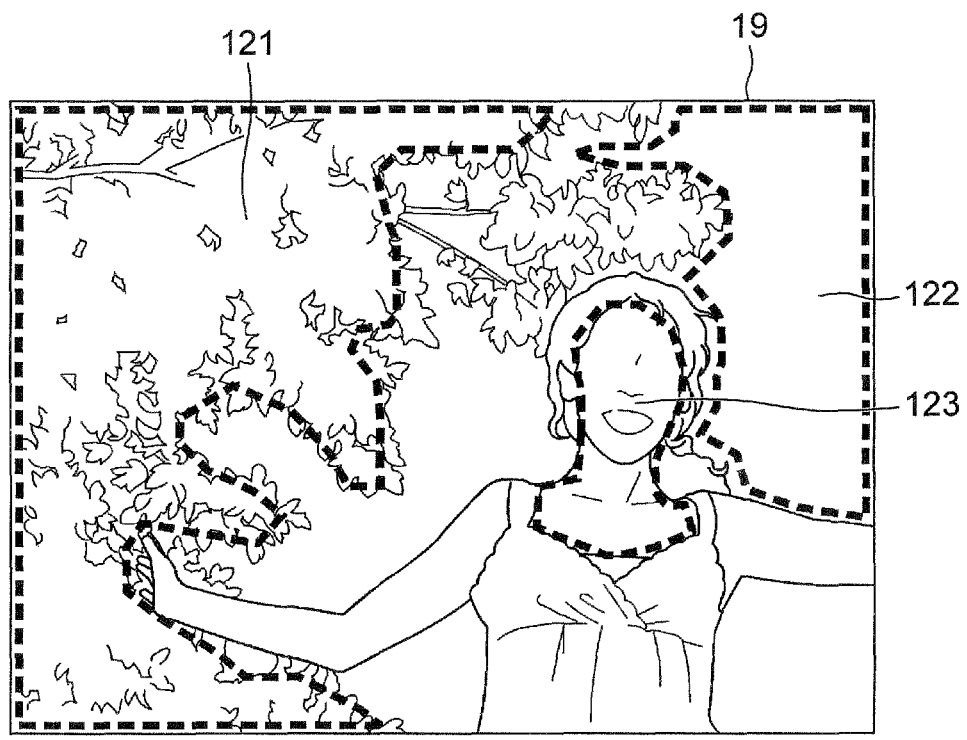
FIG. 5 is an example of a live preview image displayed at the start of imaging processing.

FIG. 5 illustrates an example of a live preview image that is displayed at the display of the output section 19 when the imaging processing begins.

When a user operates the input section 18 (FIG. 1) and switches the operation mode of the imaging device 1 to the imaging mode, the live preview display processing of step S11 (of FIG. 4) may be started by the imaging device 1. At this time, on the basis of the live preview image data acquired from the image acquisition section 41, the region type identification section 42 identifies object regions of one or more types that are contained in the live preview image.

For the identification of the object regions, each region is identified in accordance with brightnesses, hues, chrominances and the like of the live preview image. Accordingly, the region type identification section 42 may identify object regions of various types such as, for example, a person's face, a person's skin, a dark area, sky, vegetation, a sunset, night darkness and so forth. In the example in FIG. 5, the type of object region 121 is identified as vegetation, the type of object region 122 is identified as sky, and the type of object region 123 is identified as a person's skin.

FIG. 6A to FIG. 8C illustrate examples of images that are displayed at the display of the output section 19 during the imaging processing in a situation in which the imaging environment is "person+backlighting, etc.", that is, a live preview image containing at least person and backlighting object regions as the object regions.

Figure 6A:
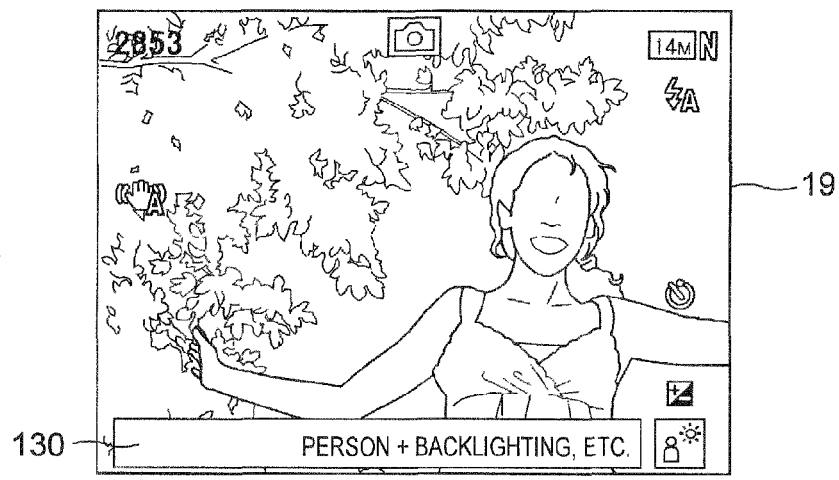
FIG. 6A to FIG. 6C are an example of a live preview image displayed during imaging processing in a case in which an imaging environment is "person+backlighting, etc"

As illustrated in FIG. 6A, when the current imaging environment is identified by the imaging condition determination section 45 (step S12 in FIG. 4), an imaging environment information box 130 representing the identified imaging environment is displayed at the bottom of the display of the output section 19. In the present embodiment, it is identified that the imaging environment is "person+backlighting+sky+vegetation+sunlight". Therefore, "person+backlighting, etc.", which is a shortened identification of the imaging environment, is displayed in the imaging environment information box 130.

Figure 6B:
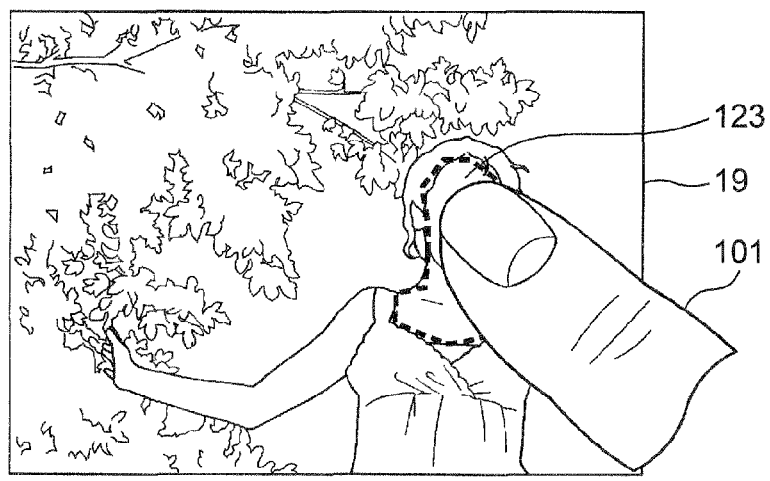

As illustrated in FIG. 6B, if a screen touch operation is performed on the object region 123 indicating the person's face by a finger 101 of the user without the shutter release button of the input section 18 being operated ("NO" in step S13 of FIG. 4), the object region 123 is chosen as the selected region (step S15 in FIG. 4). The image quality processing choosing section 46 then refers to the reference table of FIG.

3, and chooses image quality processing information (menu items) in accordance with the imaging conditions and the identified selected region.

Figure 6C:
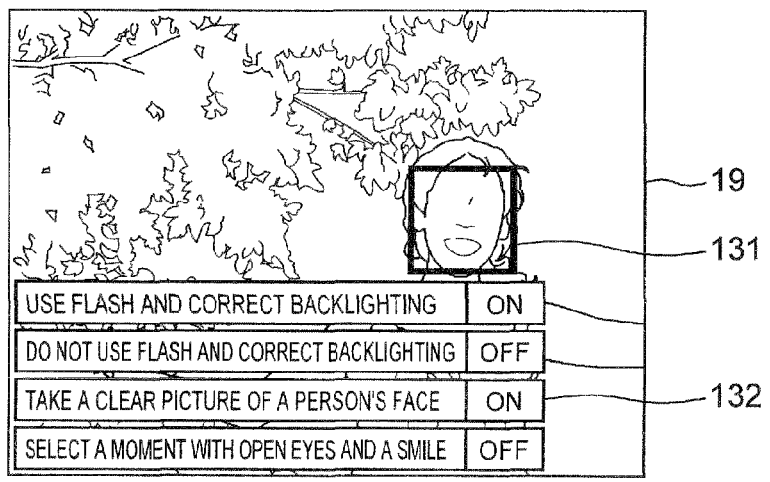

As illustrated in FIG. 6C, the image quality processing information presentation section 47 displays image quality processing information (menu items) 132 that has been chosen for the chosen selected region on the display of the output section 19 (step S17 in FIG. 4).

In the example in FIG. 6C, the face that has been chosen as the selected region is indicated by a frame 131, and the image quality processing information (menu items) 132 corresponding to this selected region is displayed on the display.

That is, in the present example, the image quality processing information (menu items) 132 that is displayed is selected by referring to the reference table in FIG. 3 with the imaging environment being "person+backlighting+sky+vegetation+ sunlight", the touched portion being "face", and supplementary conditions being absent. Thus, the fields (respective items of image quality processing information) "Use flash and correct backlighting", "Do not use flash and correct backlighting", "Take a clear picture of a person's face", and "Select a moment with open eyes and a smile" are displayed as the image quality processing information (menu items) 132.

Figure 7A:
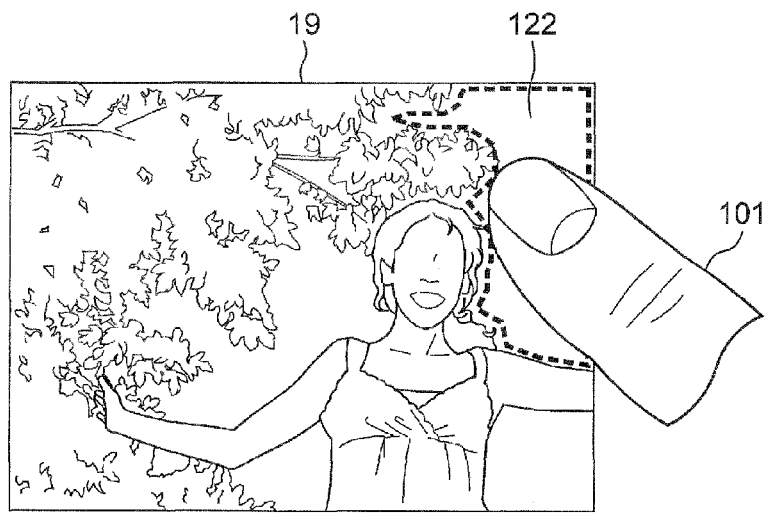
FIG. 7A and FIG. 7B are an example of a live preview image displayed during imaging processing in a case in which the imaging environment is "person+backlighting, etc"

Then, if, as illustrated in FIG. 7A, a screen touch operation is performed on the object region 122 indicating the sky by the finger 101 of the user without the shutter release button of the input section 18 being operated ("NO" in step S13 of FIG. 4), the object region 122 is identified as the selected region (step S15 in FIG. 4). The image quality processing choosing section 46 then refers to the reference table of FIG. 3 and chooses the image quality processing information (menu items) in accordance with the imaging conditions and the identified selected region.

Figure 7B:
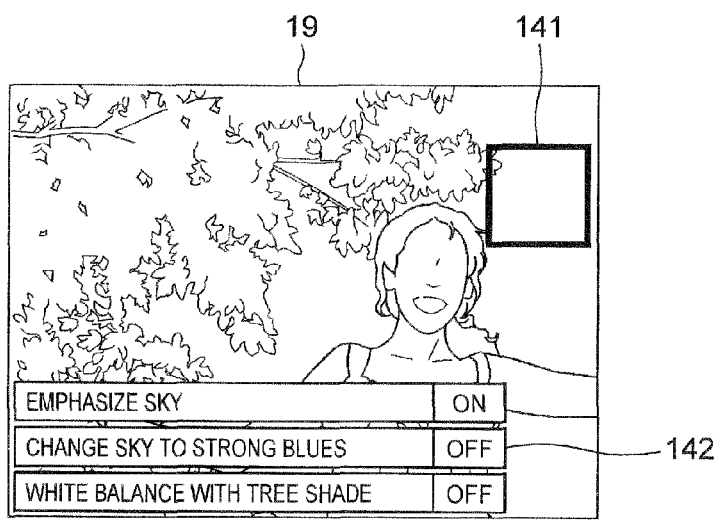

As illustrated in FIG. 7B, the image quality processing information presentation section 47 displays image quality processing information (menu items) 142 that has been chosen for the chosen selected region on the display of the output section 19 (step S17 in FIG. 4).

In the example in FIG. 7B, the sky that has been chosen as the selected region is indicated by a frame 141, and the image quality processing information (menu items) 142 corresponding to this selected region is displayed on the display.

That is, in the present example, the image quality processing information (menu items) 142 that is displayed is selected by referring to the reference table in FIG. 3 with the imaging environment being "person+backlighting+sky+vegetation+ sunlight", the touched portion being "sky", and supplementary conditions being absent. Thus, the fields (respective items of image quality processing information) "emphasize sky", "Change sky to strong blues", and "White balance with tree shade" are displayed as the image quality processing information (menu items) 142.

Figure 8A:
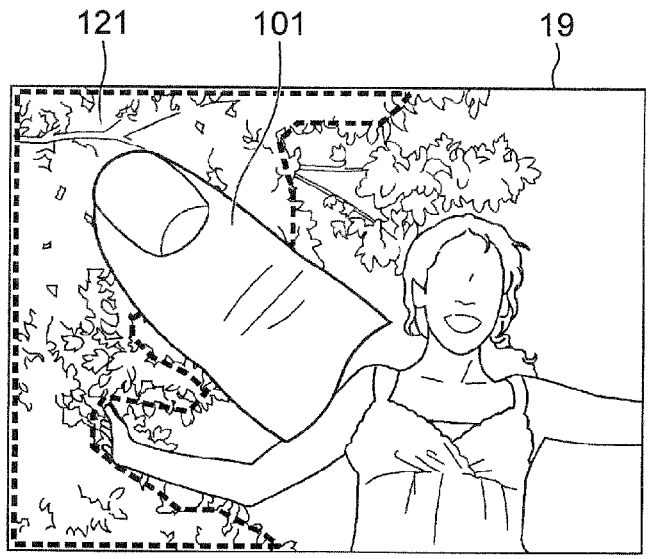
FIG. 8A and FIG. 8B are an example of a live preview image displayed during imaging processing in a case in which the imaging environment is "person+backlighting, etc"

Then, if, as illustrated in FIG. 8A, a screen touch operation is performed on the object region 121 indicating the vegetation by the finger 101 of the user without the shutter release button of the input section 18 being operated ("NO" in step S13 of FIG. 4), the object region 121 is chosen as the selected region (step S15 in FIG. 4). The image quality processing choosing section 46 then refers to the reference table of FIG. 3, and chooses the image quality processing information (menu items) in accordance with the imaging conditions and the identified selected region.

Figure 8B:
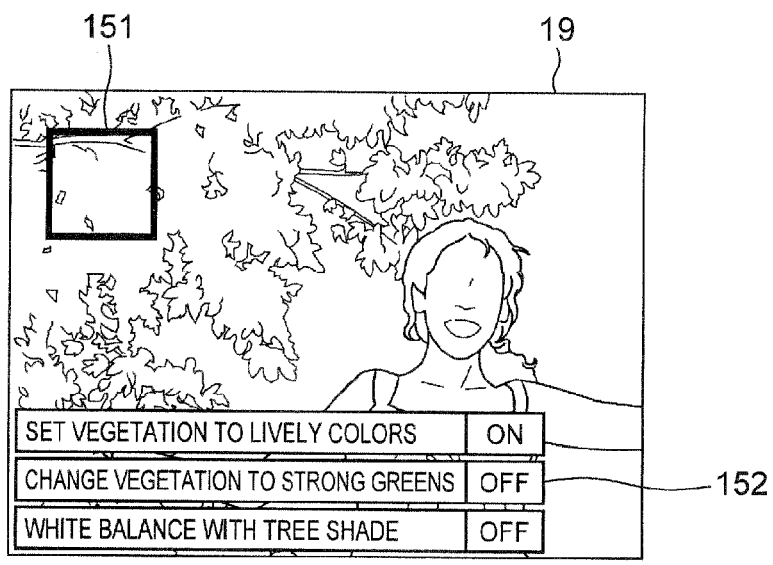

As illustrated in FIG. 8B, the image quality processing information presentation section 47 displays image quality processing information (menu items) 152 that has been chosen for the chosen selected region on the display of the output section 19 (step S17 in FIG. 4).

In the example in FIG. 8B, the vegetation that has been chosen as the selected region is indicated by a frame 151, and the image quality processing information (menu items) 152 corresponding to this selected region is displayed on the display.

That is, in the present example, the image quality processing information (menu items) 152 that is displayed is selected by referring to the reference table in FIG. 3 with the imaging environment being "person+backlighting+sky+vegetation+ sunlight", the touched portion being "vegetation", and supplementary conditions being absent. Thus, the fields "Set vegetation to lively colors", "Change vegetation to strong greens", and "White balance with tree shade" are displayed as the image quality processing information (menu items) 152.

Figure 9A:
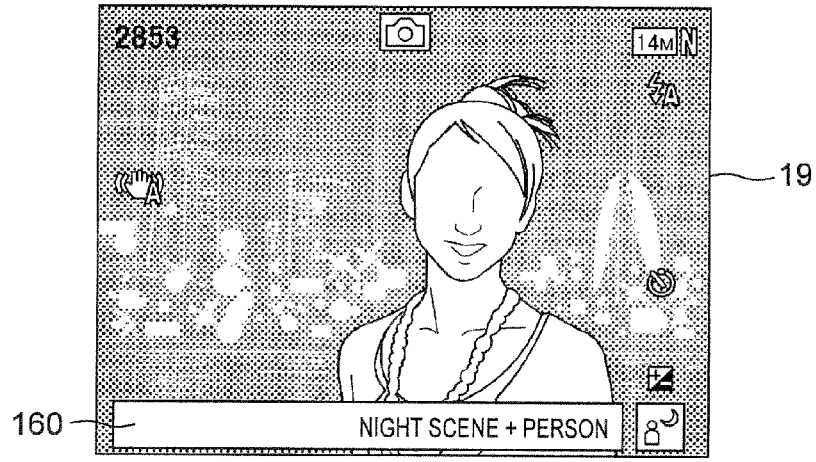
FIG. 9A to FIG. 9C are an example of a live preview image displayed during image processing in a case in which the imaging environment is "night scene+person"
Figure 9B:
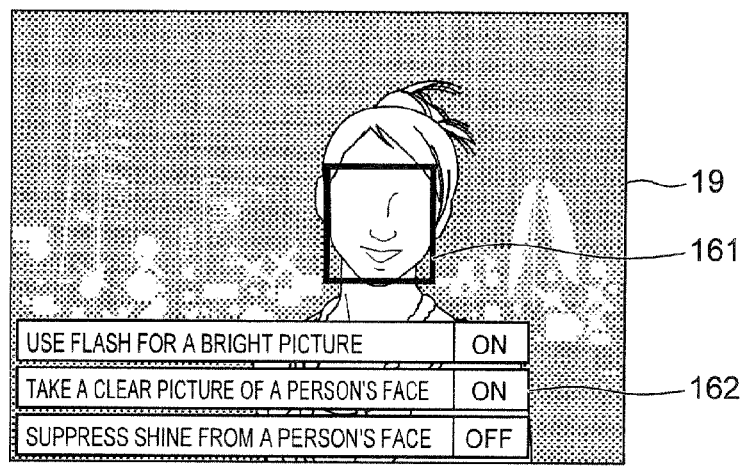
Figure 9C:
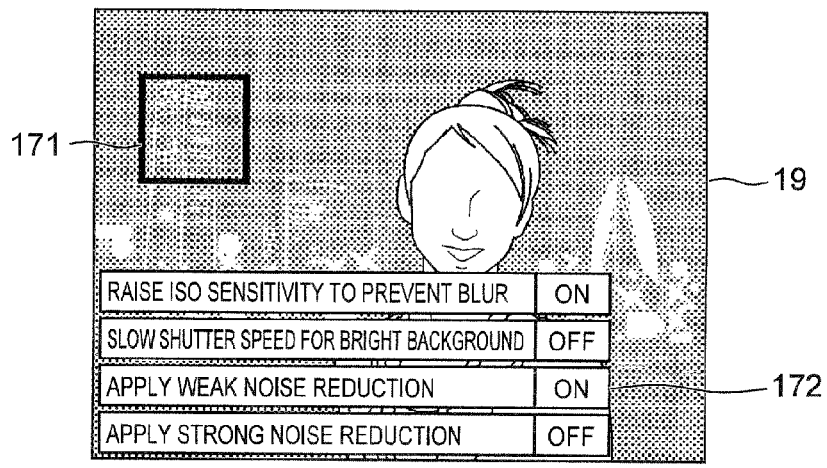

FIG. 9A to FIG. 9C illustrate an example of an image that is displayed at the display of the output section 19 during imaging processing in a situation in which the imaging environment is "night scene+person", that is, a live preview image containing night scene and person object regions as the object regions.

As illustrated in FIG. 9A, when the current imaging environment is identified by the imaging condition determination section 45 (step S12 in FIG. 4), an imaging environment information box 160 representing the identified imaging environment is displayed at the bottom of the display of the output section 19. In the present embodiment, it is determined that the imaging environment is "night scene+person". Therefore, "night scene+person", which is the identification of the imaging environment, is displayed in the imaging environment information box 160.

As illustrated in FIG. 9B, if a screen touch operation is performed on the object region indicating the person's face without the shutter release button of the input section 18 being operated ("NO" in step S13 of FIG. 4), that object region is chosen as the selected region (step S15 in FIG. 4). The image quality processing choosing section 46 then refers to the reference table of FIG. 3, and chooses the image quality processing information (menu items) in accordance with the imaging conditions and the identified selected region.

The image quality processing information presentation section 47 then displays image quality processing information (menu items) 162 that has been chosen for the chosen selected region on the display of the output section 19 (step S17 in FIG. 4).

In the example in FIG. 9B, the face that has been chosen as the selected region is indicated by a frame 161, and the image quality processing information (menu items) 162 corresponding to this selected region is displayed on the display.

That is, in the present example, the image quality processing information (menu items) 162 that is displayed is selected by referring to the reference table in FIG. 3 with the imaging environment being "night scene+person", the touched portion being "face", and supplementary conditions being absent. Thus, the fields (respective items of image quality processing information) "Use flash for a bright picture", "Take a clear picture of a person's face", and "Suppress shine from a person's face" are displayed as the image quality processing information (menu items) 162.

If, as illustrated in FIG. 9C, a screen touch operation is performed on the object region indicating the night scene that is not the face without the shutter release button of the input section 18 being operated ("NO" in step S13 of FIG. 4), that object region is chosen as the selected region (step S15 in FIG. 4). The image quality processing choosing section 46 then refers to the reference table of FIG. 3, and chooses the image quality processing information (menu items) in accordance with the imaging conditions and the identified selected region.

The image quality processing information presentation section 47 then displays image quality processing information (menu items) 172 that has been chosen for the chosen selected region on the display of the output section 19 (step S17 in FIG. 4).

In the example in FIG. 9C, the night scene outside the face that has been chosen as the selected region is indicated by a frame 171, and the image quality processing information (menu items) 172 corresponding to this selected region is displayed on the display.

That is, in the present example, the image quality processing information (menu items) 172 that is displayed is selected by referring to the reference table in FIG. 3 with the imaging environment being "night scene+person", the touched portion being "night scene outside face", and supplementary conditions being absent. Thus, the fields (respective items of image quality processing information) "Raise ISO sensitivity to prevent blur", "Slow shutter speed for bright background", "Apply weak noise reduction", and "Apply strong noise reduction" are displayed as the image quality processing information (menu items) 172.

Figure 10A:
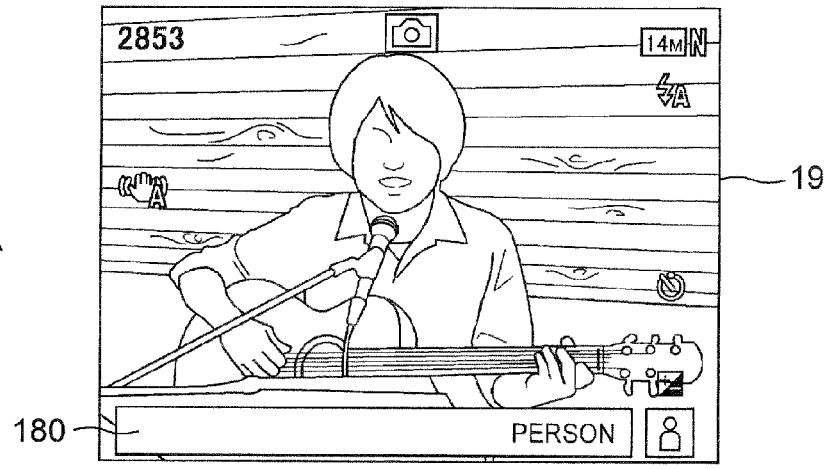
FIG. 10A to FIG. 10C are an example of a live preview image displayed during imaging processing in a case in which the imaging environment is "person".
Figure 10B:
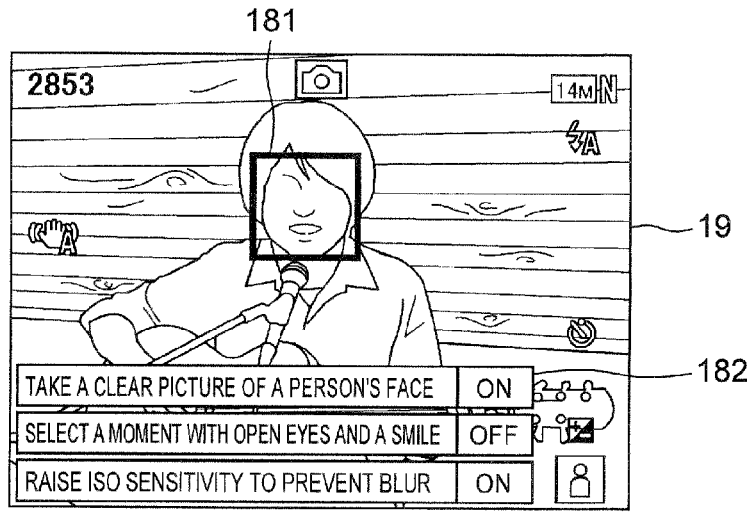
Figure 10C:
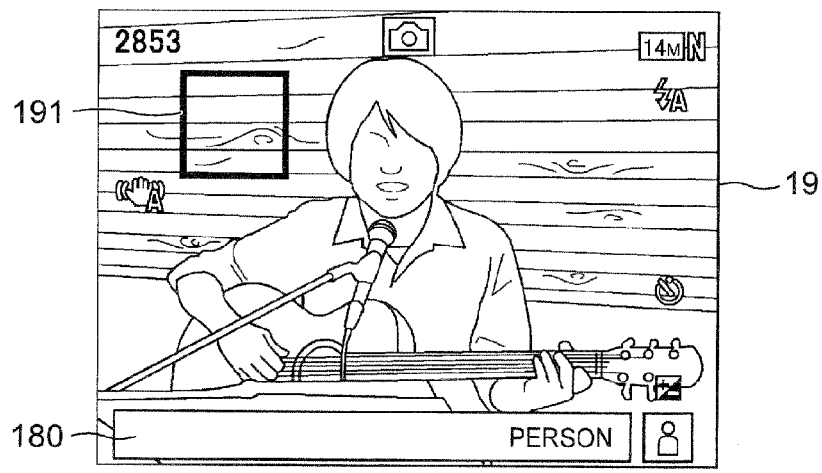

FIG. 10A to FIG. 10C illustrate an example of an image that is displayed at the display of the output section 19 during imaging processing when the imaging environment is "person", that is, a live preview image containing a "person" object region as an object region.

As illustrated in FIG. 10A, when the current imaging environment is identified by the imaging condition determination section 45 (step S12 in FIG. 4), an imaging environment information box 180 representing the identified imaging environment is displayed at the bottom of the display of the output section 19. In the present mode, it is identified that the imaging environment is "person". Therefore, "person", which is the identification of the imaging environment, is displayed in the imaging environment information box 180.

As illustrated in FIG. 10B, if a screen touch operation is performed on the object region indicating the person's face without the shutter release button of the input section 18 being operated ("NO" in step S13 of FIG. 4), that object region is chosen as the selected region (step S15 in FIG. 4). The image quality processing choosing section 46 then refers to the reference table of FIG. 3, and chooses the image quality processing information (menu items) in accordance with the imaging conditions and the identified selected region.

The image quality processing information presentation section 47 then displays image quality processing information (menu items) 182 that has been chosen for the chosen selected region on the display of the output section 19 (step S17 in FIG. 4).

In the example in FIG. 10B, the face that has been chosen as the selected region is indicated by a frame 181, and the image quality processing information (menu items) 182 corresponding to this selected region is displayed on the display.

That is, in the present example, the image quality processing information (menu items) 182 that is displayed is selected by referring to the reference table in FIG. 3 with the imaging environment being "person", the touched portion being "face", and supplementary conditions being absent. Thus, the fields (respective items of image quality processing information) "Take a clear picture of a person's face", "Select a moment with open eyes and a smile", and "Raise ISO sensitivity to prevent blur" are displayed as the image quality processing information (menu items) 182.

If, as illustrated in FIG. 10C, a screen touch operation is performed on an object region showing something other than the face without the shutter release button of the input section 18 being operated ("NO" in step S13 of FIG. 4), that object region is chosen as the selected region (step S15 in FIG. 4). The image quality processing choosing section 46 then refers to the reference table of FIG. 3, and chooses the image quality processing information (menu items) in accordance with the imaging conditions and the chosen selected region.

In this case, the image quality processing information presentation section 47 displays only a frame 191 corresponding with the chosen selected region on the display of the output section 19 (step S17 in FIG. 4).

In the example in FIG. 10C, the region outside the face that has been chosen as the selected region is indicated by the frame 191. Because there is no image quality processing information (menu item) corresponding to this selected region in the reference table of FIG. 3, no image quality processing information (menu item) is displayed.

Thus, even if screen touch operations are performed in the same imaging environment, the image quality processing information (menu items) that is displayed differs in accordance with touched portions.

Moreover, even if screen touch operations are performed on object regions that each represent the face of a person, the image quality processing information (menu items) that is displayed differs between the mode in FIG. 9A to FIG. 9C and the mode in FIG. 10A to FIG. 10C. That is, the image quality processing information (menu items) that is displayed differs in accordance with the imaging environment even though touched portions that are the same are selected.

As described above, the image processing apparatus employed in the imaging device 1 of the present embodiment is equipped with the image acquisition section 41, the input operation receiving section 43, the image quality processing choosing section 46 and the image quality processing information presentation section 47.

The image acquisition section 41 acquires data of an image.

The input operation receiving section 43 receives an operation of selection of an image region from the image data acquired by the image acquisition section 41.

The image quality processing choosing section 46 chooses image quality process(es) to be applied to the image data acquired by the image acquisition section 41 in accordance with the image region received by the input operation receiving section 43.

The image quality processing information presentation section 47 presents information relating to the image quality processes chosen by the image quality processing choosing section 46.

Here, the information of the image quality processes (image quality processing information) may be chosen in accordance with the user selection received by the input operation receiving section 43. Then the information of the chosen image quality processes (image quality processing information) is presented. Thus, a user may adjust image quality in accordance with the user's wide-ranging preferences without being constrained by image quality processing that is uniformly defined in advance.

The information of image quality processes (image quality processing information) is chosen in accordance with a selected range whose image quality the user wishes to alter. Thus, any user may easily perform the image quality adjustments they desire just by selecting an image quality process that they are interested in from the information of image quality processes (image quality processing information) corresponding to the selected range.

Further, the image acquisition section 41 of the image processing apparatus employed at the imaging device 1 of the present embodiment acquires data of an image acquired by the imaging section 17.

The image acquisition section 41 of the image processing apparatus employed at the imaging device 1 of the present embodiment is functionally equipped with the region type identification section 42, the selected region choosing section 44 and the imaging condition determination section 45.

On the basis of the image data acquired by the image acquisition section 41, the region type identification section 42 identifies object regions of one or more types that are contained in the image.

Of the object regions of one or more types identified by the region type identification section 42, the selected region choosing section 44 chooses an object region that contains an image region received by the input operation receiving section 43 as the selected region.

On the basis of the object regions of one or more types identified by the region type identification section 42, the imaging condition determination section 45 determines imaging conditions, including the imaging environment of the imaging section 17 when imaging the image.

Then, in accordance with the selected region chosen by the selected region choosing section 44 and the imaging environment determined by the imaging condition determination section 45, the image quality processing choosing section 46 chooses image quality processes to be applied to the image data acquired by the image acquisition section 41.

Here, the information of the image quality processes is chosen in accordance with both the selected region chosen on the basis of the user selection received by the input operation receiving section 43 and the imaging conditions including the imaging environment. Therefore, the choice of information of image quality processes is more reliable. Thus, any user may easily perform the image quality adjustments they desire just by selecting an image quality process that they are interested in from information of image quality processes that have been reliably identified and chosen.

The imaging condition determination section 45 of the image processing apparatus employed at the imaging device 1 of the present embodiment determines both the imaging environment and supplementary conditions. Here, the information of the image quality processes is chosen in accordance with imaging conditions including the supplementary conditions as well as the imaging environment. Therefore, the choice of information of image quality processes is more reliable. Thus, any user may easily perform the image quality adjustments they desire just by selecting an image quality process that they are interested in from the information of image quality processes that have been reliably identified and chosen.

The imaging condition determination section 45 of the image processing apparatus employed at the imaging device 1 of the present embodiment also determines supplementary conditions in accordance with imaging conditions including a blur signal sent from the angular speed sensor 21 at the time of imaging. Here, because a supplementary condition is determined on the basis of the blur signal, the choice of information of image quality processes is more reliable. Thus, any user may easily perform the image quality adjustments they desire just by selecting an image quality process that they are interested in from the information of image quality processes that have been reliably identified and chosen.

The imaging condition determination section 45 of the image processing apparatus employed at the imaging device 1 of the present embodiment also determines a supplementary condition in accordance with the zoom ratio of the imaging section 17. Here, because the supplementary condition is identified on the basis of the zoom ratio, the choice of information of image quality processes is more reliable. Thus, any user may easily perform the image quality adjustments they desire just by selecting an image quality process that they are interested in from the information of image quality processes that have been reliably identified and chosen.

The image processing apparatus employed at the imaging device 1 of the present embodiment is further provided with the image quality processing information setting section 49 that, of the information presented by the image quality processing information presentation section 47, sets information selected on the basis of a selection operation received by the input operation receiving section 43 as current information. Here, the image quality processing information setting section 49 may make settings of information of image quality processes (image quality processing information) on the basis of user selections received by the input operation receiving section 43. Hence, image quality processing is carried out in accordance with the specified information of image quality processes (image quality processing information). Thus, a user may perform image quality processing in accordance with the user's wide-ranging preferences without being constrained by image quality processing that is uniformly defined in advance.

The present invention is not limited to the embodiment described above; the present invention encompasses modifications and improvements within a scope in which the objectives of the present invention may be achieved.

In the above embodiment, a supplementary condition is determined in accordance with the zoom ratio, but this is not limiting. For example, a supplementary condition may be determined on the basis of an aperture for adjusting amounts of light that are incident on the imaging section 17.

The image processing apparatus of the present embodiment is employed at the imaging device 1, but this is not a limitation. The image processing apparatus may be employed at any kind of terminal provided the terminal may carry out image processing that includes image quality processing.

In the embodiment described above, a digital camera is described as an example of the present invention, but this is not a particular limitation. For example, the present invention may be generally applied to electronic devices with imaging functions. Specifically, the present invention is applicable to, for example, notebook computers, printers, television sets, video cameras, portable navigation devices, portable telephones, portable video game machines and so forth.

The sequence of processing described above may be executed by hardware and may be executed by software. That is, the functional structure in FIG. 2 is merely an example and is not particularly limiting. In other words, it is sufficient that a function capable of executing the whole of the above-described sequence of processing is provided at the imaging device 1; the kinds of functional blocks to be used for executing this function are not particularly limited by the example in FIG. 2. An individual functional block may be constituted by a hardware unit, may be constituted by a software unit, and may be constituted by a combination thereof.

If the sequence of processing is executed by software, a program constituting the software is installed on a computer or the like from a network, a recordable medium or the like. The computer may be a computer incorporating dedicated hardware. Further, the computer may be a computer that is capable of installing various programs and executing various functions; for example, it may be a general purpose personal computer.

A recordable medium storing the program may be constituted by the removable medium 31 of FIG. 1, which is distributed separately from the main body of the device for provision of the program to users, and may be constituted by a recordable medium or the like that is provided to users in a state of being pre-incorporated in the device main body. The removable medium 31 is constituted by, for example, a magnetic disc (such as a floppy disk), an optical disc, a magneto-optical disc or the like. An optical disc is constituted by, for example, a CD-ROM (Compact Disc Read-only memory), a DVD (Digital Versatile Disc) or the like. A magneto-optical disc is constituted by a MiniDisc (MD) or the like. A recording medium on which the data is provided to the user in a state of being pre-incorporated in the device main body is constituted by, for example, the ROM 12 of FIG. 1 in which a program is stored, a hard disc included in the memory section 20 of FIG. 1, or the like.

Obviously, processing in which the steps describing the program stored in the recording medium are carried out chronologically in the described order is encompassed by the present specification. Processing that is not necessarily carried out chronologically but in which the steps are executed in parallel or separately is also to be encompassed. Moreover, the term "system" as used in the present specification is intended to include the whole of equipment constituted by plural devices, plural means and the like.

The preferable embodiment of the present invention described in detail above is merely an example and does not limit the technical scope of the invention. The present invention may be attained by numerous other embodiments, and numerous modifications such as omissions, substitutions and the like are possible within a technical scope not departing from the spirit of the invention. These embodiments and modifications are to be encompassed by the scope and spirit of the invention described in the present specification and the like, and are to be encompassed by the inventions recited in the attached claims and their equivalents.

What is claimed is:

1. An image processing apparatus comprising:
   an acquiring unit that acquires data of an image;
   a receiving unit that receives an operation of selection of a region in the image acquired by the acquiring unit;
   an image quality processing choosing unit that, in accordance with the image at the region selected by the selection operation, chooses image quality processing to be applied to the image data acquired by the acquiring unit; and
   a presenting unit that presents information relating to the image quality processing chosen by the image quality processing choosing unit,
   wherein the acquiring unit acquires image data acquired by an imaging unit,
   wherein the image processing apparatus further comprises:
      an identifying unit that, based on the image data acquired by the acquiring unit, identifies object regions of one or more types contained in the image;
      a selected region choosing unit that, of the object regions of one or more types identified by the identifying unit, chooses an object region containing the region selected by the selection operation as a selected region; and
      a determining unit that, based on the object regions of one or more types identified by the identifying unit, determines an imaging condition, including an imaging environment of the imaging unit when imaging the image, and
   wherein the image quality processing choosing unit chooses the image quality processing to be applied to the image data acquired by the acquiring unit in accordance with the selected region chosen by the selected region choosing unit and the imaging condition determined by the determining unit.

2. The image processing apparatus according to claim 1, wherein the determining unit determines both the imaging environment and a supplementary condition.

3. The image processing apparatus according to claim 2, wherein the determining unit determines the supplementary condition in accordance with an imaging condition that includes a blur signal sent from an angular speed sensor at a time of imaging.

4. The image processing apparatus according to claim 2, wherein the determining unit determines the supplementary condition in accordance with a zoom ratio of the imaging unit.

5. The image processing apparatus according to claim 1, further comprising an image quality processing information setting unit that, of the information presented by the presenting unit, sets information selected based on a selection operation as current information.

6. An image processing method to be executed by an image processing apparatus that acquires an image by imaging, the method comprising:
   acquiring data of the image acquired by the imaging;
   receiving an operation of selection of a region in the acquired image data;
   choosing, in accordance with the image at the region selected by the selection operation, image quality processing to be applied to the acquired image data; and
   presenting information relating to the image quality processing,
   identifying, based on the acquired image data, object regions of one or more types contained in the image;
   choosing, of the identified object regions of one or more types, an object region containing the region selected by the selection operation as a selected region; and
   determining, based on the identified object regions of one or more types, an imaging condition, including an imaging environment of the imaging,
   wherein the choosing of the image quality processing to be applied to the acquired image data is performed in accordance with the chosen selected region and the determined imaging condition.

7. A non-transitory computer readable storage medium having stored therein a program executable by a computer that controls an image processing apparatus that acquires an image by imaging, to cause the computer to control the image processing apparatus to perform functions comprising:
   acquiring data of the image acquired by the imaging;
   receiving an operation of selection of a region in the acquired image data;
   choosing, in accordance with the image at the region selected by the selection operation, image quality processing to be applied to the acquired image data; and
   presenting information relating to the image quality processing,
   identifying, based on the acquired image data, object regions of one or more types contained in the image;
   choosing, of the identified object regions of one or more types, an object region containing the region selected by the selection operation as a selected region; and determining, based on the identified object regions of one or more types, an imaging condition, including an imaging environment of the imaging,
wherein the choosing of the image quality processing to be applied to the acquired image data is performed in accordance with the chosen selected region and the determined imaging condition.

* * * * *